March 18, 1941.  J. E. O'DONNELL  2,235,383
GAUGE FOR SPINDLES AND THE LIKE
Filed April 27, 1940

INVENTOR.
BY John E. O'Donnell,
Arthur F. Randall, Atty.

Patented Mar. 18, 1941

2,235,383

UNITED STATES PATENT OFFICE 2,235,383

GAUGE FOR SPINDLES AND THE LIKE

John E. O'Donnell, Boston, Mass.

Application April 27, 1940, Serial No. 331,896

1 Claim. (Cl. 33—193)

My invention relates to gauges for use in testing axle spindles, shafts and the like in order to determine whether they are bent or straight and, if bent, the degree or amount of the defect.

The object of the invention is to provide an improved gauge of the class indicated which will be of simple and inexpensive construction, and by means of which the condition of an axle spindle or the like can be quickly and accurately determined.

To these ends I have provided an improved gauge of the class described having the features of construction and operation set forth in the following description, the several novel features thereof being separately pointed out and defined in the claim at the close of said description.

In the accompanying drawing—

Figure 1:
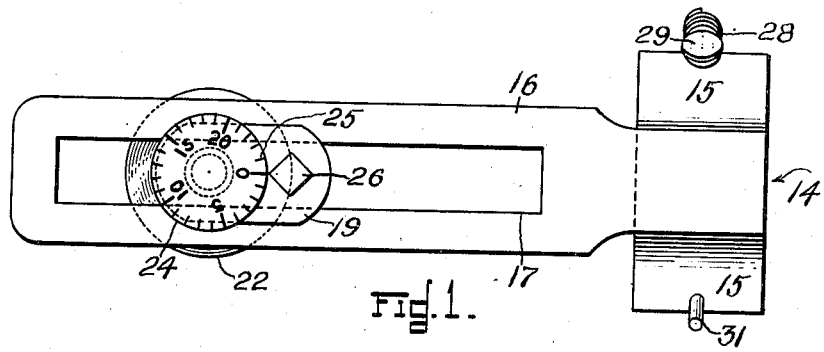
Figure 1 is a top plan view of my improved gauge.

The steering knuckle of an automobile is made with a hub 10 (Fig. 2) and with a horizontal spindle 11 projecting radially therefrom, said spindle being made with an inner cylindrical portion 12 and an outer cylindrical portion 13. When the spindle 11 is in its original straight condition the two portions 12 and 13 are in axial alinement and have mounted upon them the inner rings of roller or ball bearings through which the spindle supports the hub of the wheel. Frequently, through shock or accident the intermediate portion of spindle 11 becomes bent with the result that the wheel wobbles or injurious strains and stresses are imposed upon the bearings and upon the spindle itself. My invention provides a gauge of the class described for use in testing the alinement of the cylindrical portions 12 and 13 without the necessity of removing the steering knuckle from the axle.

The illustrated embodiment of my invention comprises a body 14 made with a pair of divergent legs 15, 15 providing between them a V-shaped crotch adapted to be seated upon the cylindrical portion 12 of the spindle. The body 14 is also made with a horizontal cantilever arm 16 whose top and bottom sides are flat and parallel. As shown in Fig. 1, the cantilever arm 16 is formed with a medial slot 17 that is occupied by the lower key portion 18 of a slide 19 whose upper portion is of greater width than the slot 17 so that it is seated upon the top of the cantilever arm 16 at opposite sides of slot 17. The lower key portion 18 of slide 19 is of approximately the same width as slot 17 so that when slide 19 is not locked in position on the cantilever arm 16 it may be adjusted lengthwise of the latter as may be required in testing the spindle 11 but cannot turn thereon.

Figure 3:
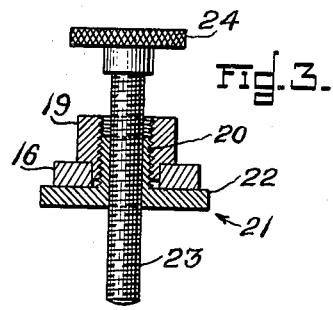
Figure 3 is a section on line 3—3 of Fig. 2.
Figure 2:
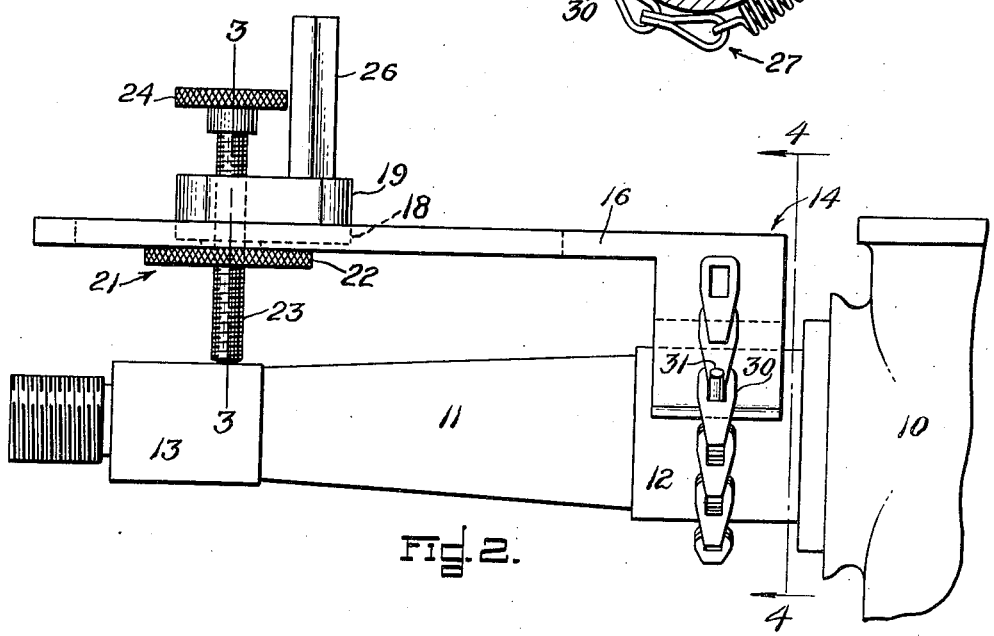
Figure 2 is a side elevation of the gauge illustrated in Fig. 1, showing the same applied to the spindle of an automobile steering knuckle.

As shown in Fig. 3, slide 19 is formed with a hole extending vertically therethrough and this hole is interiorly threaded to receive within it the exteriorly threaded tubular shank 20 of a thumb nut 21 provided at its lower end with a circular flange 22 whose periphery is knurled, as shown in Fig. 2. The interior of nut 21 is also threaded and in threaded engagement with a micrometer thumb screw 23 that is provided at its upper end with a peripherally knurled circular head 24. The top side of head 24, adjacent to its periphery, is marked or calibrated, with a circular scale 25 including twenty-five equi-distant radial marks. The carriage 19 is provided with a rigid upstanding index post 26 that is square in cross section and disposed with one of its corners nearest, and closely adjacent, to the periphery of head 24 so as to cooperate with the scale on the top of the latter. The shank of thumb screw 23 is threaded forty threads to the inch, and therefore rotative movement of screw 23 to the extent of one of the divisions of scale 25 will move screw 23 endwise or axially, relatively to slide 19, to the extent of one one-thousandth of an inch.

Figure 4:
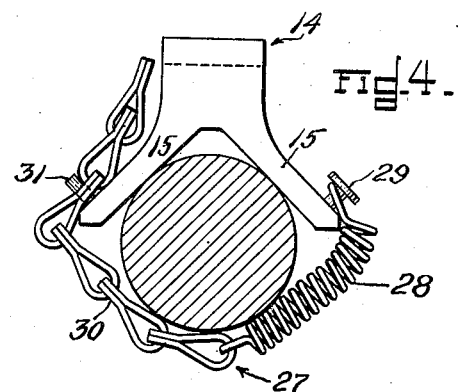
Figure 4 is a section on line 4—4 of Fig. 2.

When the crotch 15—15 is held in position on the cylindrical portion 12 of the spindle the cantilever arm 16 will be supported in a position where it is parallel with the axis of said cylindrical portion 12. The crotch 15—15 is secured in position upon the cylindrical portion 12 of the spindle by means of a girdle that is indicated generally at 27, said girdle comprising a coiled spring 28 whereof one end is fastened to a stud 29 projecting from the exterior of one of the legs 15 and whereof the opposite end is fastened to one end of a length of chain 30 which chain is separably engaged with a stud 31 projecting from the outer side of the other leg 15. In applying the gauge to the cylindrical portion 12 the crotch 15—15 is placed against the latter and then while pulling up on the chain 30 so as to stretch the spring 28 one of the links of the chain is engaged, as shown in Fig. 4, with the stud 31.

After securing the crotch in position upon the portion 12 of the spindle the slide 19 is adjusted longitudinally on cantilever arm 16 into proper relationship with respect to the cylindrical portion 13 and locked in that position by setting up tight the thumb nut 22. Thereafter micrometer screw 23 is adjusted into a position where its lower end just contacts the cylindrical portion 13. If the gauge be now swung around the axis of the spindle and the portions 12 and 13 of the latter are in axial alinement the micrometer screw 23 will remain in contact with the portion 13 throughout the circuit of the latter and the fact that it does this is ascertained by tapping with the finger against the outer side of the free end of the cantilever 16. If there is no pounding of the screw 23 against the spindle at any place throughout the circuit of the portion 13 then the fact is evident that the two portions 12 and 13 are in axial alinement. If, however, the gauge is rotatively adjusted step by step around the axis of the spindle and there is pounding of screw 23 against the spindle when cantilever arm 16 is tapped upon, as described, while the gauge occupies any one of its different positions to which it is adjusted, then it will be obvious that the spindle is bent and the extent of deflection of the outer end of the spindle can be measured by rotatively adjusting the micrometer screw until its inner end contacts with portion 13 of the spindle. That is to say, when the micrometer screw is adjusted, as just described, and the rotative displacement thereof is measured by means of scale 25 and index post 26 the extent of deflection of the outer end of the spindle is determined to the one one-thousandth of an inch or fraction thereof.

After the device has been applied to a spindle, shaft or the like which is to be tested, it is placed in different angular positions in order to find that position which requires the least inward adjustment of the screw 23 and then the device is angularly adjusted on the spindle or shaft to the extent of 180 degrees and if the micrometer screw 23 is then out of contact with the spindle or shaft said screw is adjusted inwardly while the device is occupying this last position, the extent of such adjustment, as measured by the scale, will show the degree of deflection of the shaft or spindle.

What I claim is:

A gauge of the class described comprising a body made with a crotch to seat upon a spindle or the like and with a cantilever arm projecting laterally from said crotch and supported by the latter in parallel relationship with respect to the axis of the spindle or the like, said arm being made with a longitudinal slot; a slide mounted upon the top side of said arm made with a key fitting into said slot so as to hold said slide against sidewise displacement on said arm but with provision for adjustment lengthwise thereon, said slide being also formed with a threaded hole extending therethrough whose axis is disposed at right angles to and intersects the axis of the spindle or the like to which the gauge is applied; a thumb nut made with an interiorly and exteriorly threaded tubular shank screwed upwardly into said threaded hole, said shank being provided at its lower end with a head which is tightened against the bottom side of said arm to fixedly clamp said slide in its adjusted position; a manually operated thumb screw extending through and in threaded engagement with said nut, the upper end of said screw being made with a circular head bearing a scale and the lower end thereof being adapted to abut the spindle or the like; an up-standing index post on said slide co-operatively disposed with respect to said scale, and means separably clamping said crotch in position on the spindle or the like.

JOHN E. O'DONNELL.